United States Patent
Kikukawa

(10) Patent No.: US 11,396,924 B2
(45) Date of Patent: Jul. 26, 2022

(54) BELT ELEMENT FOR VEHICULAR TRANSMISSION BELT

(71) Applicant: TOYOTA JIDOSHA KABUSHIKI KAISHA, Toyota (JP)

(72) Inventor: Daisuke Kikukawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 671 days.

(21) Appl. No.: 16/234,391

(22) Filed: Dec. 27, 2018

(65) Prior Publication Data

US 2019/0203804 A1 Jul. 4, 2019

(30) Foreign Application Priority Data

Dec. 28, 2017 (JP) .............................. JP2017-254047

(51) Int. Cl.
*F16G 5/16* (2006.01)
(52) U.S. Cl.
CPC ...................................... *F16G 5/16* (2013.01)
(58) Field of Classification Search
CPC ..... F16G 5/16; F16G 5/18; F16G 1/22; F16G 1/24
See application file for complete search history.

(56) References Cited

U.S. PATENT DOCUMENTS

| 4,826,473 A * | 5/1989 | Miyawaki ................. F16G 5/16 474/240 |
| 4,894,049 A * | 1/1990 | Koppelaars ............... F16G 5/16 474/240 |
| 9,080,639 B2 * | 7/2015 | Harima ..................... F16G 5/16 |
| 2004/0048707 A1 | 3/2004 | Suzuki |
| 2013/0040772 A1 * | 2/2013 | Ando ........................ F16G 5/16 474/265 |
| 2014/0106919 A1 * | 4/2014 | Harima ..................... F16G 5/16 474/242 |
| 2017/0159752 A1 * | 6/2017 | Samida ................. B21D 35/001 |
| 2017/0184179 A1 * | 6/2017 | Prinsen ................... F16G 5/163 |
| 2018/0128370 A1 * | 5/2018 | Yagasaki ............... F16H 61/662 |
| 2018/0141101 A1 * | 5/2018 | Sumida .................. B21D 28/16 |
| 2018/0311719 A1 * | 11/2018 | Yagasaki ............. B21D 35/001 |
| 2019/0032749 A1 * | 1/2019 | Yagasaki .................. F16G 5/16 |

FOREIGN PATENT DOCUMENTS

| DE | 10357849 A1 | 7/2005 |
| JP | 2002-048195 A | 2/2002 |
| JP | 2011-089588 A | 5/2011 |
| JP | 2011-133015 A | 7/2011 |
| WO | 2011/076233 A1 | 6/2011 |

* cited by examiner

*Primary Examiner* — Michael R Mansen
*Assistant Examiner* — Juan J Campos, Jr.
(74) *Attorney, Agent, or Firm* — Oliff PLC

(57) ABSTRACT

A belt element for a vehicular transmission belt is designed to be supported by the bands such that the head portion is located on an outer side of the bands. The base, head and connecting portions define two slots for engagement with the respective annular bands, and the base portion has an edge extending in its width direction. The edge includes a first edge located inwardly of widthwise ends of the head portion and functioning as a fulcrum of the belt element upon rocking of the belt element, and second edges located outwardly of the widthwise ends. The base portion has a smaller thickness on an inner side of the edge than on an outer side of the edge, and the second edges are located nearer to the head portion than the first edge.

6 Claims, 6 Drawing Sheets

BELT ELEMENT FOR VEHICULAR TRANSMISSION BELT

This application claims priority from Japanese Patent Application No. 2017-254047 filed on Dec. 28, 2017, the disclosure of which is herein incorporated by reference in its entirety.

FIELD OF THE INVENTION

The present invention relates to a belt element for a vehicular transmission belt, and more particularly to a structure of the belt element which has a reduced risk of deterioration of its quality due to its entanglement with another belt element in the process of manufacture of the belt elements.

BACKGROUND OF THE INVENTION

There is known a belt element for a vehicular transmission belt connecting a pair of pulleys to each other and including two annular bands, and a multiplicity of belt elements which are supported by the two annular bands such that the belt elements are arranged side by side in a direction of their thickness annularly along the two annular bands. The belt element includes a generally trapeziform base portion, a head portion having a smaller width dimension in a direction of width of the annular bands than the base portion, and a connecting portion connecting the base portion and the head portion integrally to each other at their central parts in the direction of width of the annular bands. JP2011-133015A and JP2002-048195A disclose examples of such a belt element.

By the way, belt elements are subjected to a barrel polishing or finishing operation to remove burrs in the process of its manufacture. For example, the belt elements are put into a barrel, in which the belt elements are subjected to the barrel polishing operation. In this barrel polishing operation, the belt elements may be entangled with each other. Where slots defined between a base portion and a head portion of each belt element have a depth larger than a thickness of the belt element, the base portion of one belt element (first belt element) may extend through one of the slots of another belt element (second belt element) while the belt elements are subjected to the barrel polishing operation within the barrel. The second belt element may be inclined with respect to the first belt element due to vibration of the barrel during the barrel polishing operation, with a result of elimination of a gap between the base portion of the first belt element and the slot of the second belt element, so that the first belt element is kept entangled with the second belt element. Accordingly, there is a risk of deterioration of quality of the belt elements due to insufficient polishing of the belt elements at their parts of entanglement or contact with each other.

SUMMARY OF THE INVENTION

The present invention was made in view of the background art described above. It is therefore an object of the present invention to provide a belt element having a structure which has a reduced risk of deterioration of its quality due to its entanglement with another belt element in the process of manufacture of the belt elements.

The object indicated above is achieved according to the following modes of the present invention:

According to a first mode of the invention, there is provided a belt element for a vehicular transmission belt connecting a pair of pulleys to each other and including two annular bands, and a multiplicity of belt elements which are supported by the two annular bands such that the belt elements are arranged side by side in a direction of their thickness annularly along the two annular bands, the belt element comprising a generally trapeziform base portion, a head portion having a smaller width dimension in a direction of width of the annular bands than the base portion, and a connecting portion connecting the base portion and the head portion integrally to each other at central parts thereof in the direction of width of the annular bands, the belt element being designed to be supported by the two annular bands such that the head portion is located on an outer side of the two annular bands. The base portion, the head portion and the connecting portion define two slots for engagement with the respective two annular bands, and the base portion has an edge extending in a direction of width of the belt element, the edge including a first edge located inwardly of widthwise ends of the head portion and functioning as a fulcrum of the belt element upon rocking of the belt element relative to an abutting belt element, and second edges located outwardly of the widthwise ends of the head portion. The base portion has a smaller thickness on an inner side of the edge as seen with respect to loops of the annular bands, than on an outer side of the edge as seen with respect to the loops, and the second edges are formed so as to be located nearer to the head portion than the first edge.

According to a second mode of the invention, the belt element according to the first mode of the invention is configured such that the base portion has the same thickness at the first edge and the second edges.

According to a third mode of the invention, the belt element according to the first or second mode of the invention is configured such that the two slots are defined by slot-defining surfaces of the respective base and head portions which are opposed to each other, and opposite slot-defining surfaces of the connecting portion, and widthwise portions of the two annular bands extend through the respective two slots, and such that a fillet is formed at a corner between the outer surface of the base portion and each of the opposite side surfaces of the connecting portion, while another is formed at a corner between the inner surface of the head portion and the above-indicated each side surface of the connecting portion.

According to a fourth mode of the invention, the belt element according to any one of the first through third modes of the invention is configured such that a thickness of a part of the base portion located inwardly of the edge as seen with respect to the loops of the annular bands continuously decreases as this part extends inwardly from the edge, and the base portion has a first inclined surface extending inwardly from the first edge as seen with respect to the loops of the annular bands, and second inclined surfaces extending inwardly from the second edges as seen with respect to the loops of the annular bands, the first inclined surface and the second inclined surfaces have respective first and second angles of inclination which are equal to each other.

According to a fifth mode of the invention, the belt element according to any one of the first through third modes of the invention is configured such that a thickness of a part of the base portion located inwardly of the edge as seen with respect to the loops of the annular bands continuously decreases as this part extends inwardly from the edge, and the base portion has a first inclined surface extending inwardly from the first edge as seen with respect to the loops of the annular bands, and second inclined surfaces extending inwardly from the second edges as seen with respect to the loops of the annular bands, the first inclined surface having a first angle of inclination, while the second inclined surfaces having a second angle of inclination which is larger than the first angle of inclination.

According to a sixth mode of the invention, the belt element according to any one of the first through fifth modes of the invention is configured such that a distance between the second edges and a slot-defining surface of the base portion defining the slots is constant in the direction of width of the base portion.

According to a seventh mode of the invention, the belt element according to any one of the first through fifth modes of the invention is configured such that a distance between the second edges and a slot-defining surface of the base portion partially defining the slots decreases as the second edges extend toward respective widthwise ends of the base portion.

According to an eighth mode of the invention, the belt element according to any one of the first, second, third, sixth and seventh modes of the invention is configured such that a thickness of a part of the base portion located inwardly of the edge as seen with respect to the loops of the annular bands decreases stepwise.

In the belt element according to the first mode of the invention, the base portion, the head portion and the connecting portion define the slots for engagement with the two annular bands, and the base portion has the edge extending in the direction of its width. The edge includes the first edge located inwardly of the widthwise ends of the head portion and functioning as the fulcrum of the belt element upon rocking of the belt element relative to the abutting belt element, and the second edges located outwardly of the widthwise ends of the head portion. The base portion has the smaller thickness on the inner side of the edge as seen with respect to the loops of the annular bands, than on the outer side of the edge as seen with respect to the loops, and the second edges are formed so as to be located nearer to the head portion than the first edge. According to the present belt element, therefore, a larger amount of gap is maintained between a part of the base portion of the present belt element, which part corresponds to the second edge, and the slot of another belt element through which the base portion of the present belt element extends in the process of manufacture of the belt elements of the vehicular transmission belt, than where the first edge located inwardly of the widthwise ends of the head portion, and the second edges located outwardly of those widthwise ends are spaced apart from the head portion by the same distance. Accordingly, the base portion of the present belt element extending through the slot of the above-indicated another belt element can be more easily removed out of the slot. Thus, the structure of the present belt element has a reduced risk of entanglement with the above-indicated another belt element in the process of manufacture of the belt elements, so that the belt elements can be sufficiently polished, whereby the quality of the present belt element for the vehicular transmission belt can be improved.

According the second mode of the invention wherein the base portion has the same thickness at the first edge and the second edges, the belt element has a larger surface area of contact with the annular bands along which the multiplicity of belt elements are arranged side by side in the direction of their thickness, than where the thickness of the base portion at the second edges is smaller than that at the first edge. Accordingly, it is possible to reduce a risk of application of an excessively large stress to the annular bands.

In the belt element according to the third mode of the invention, the two slots are defined by the slot-defining surfaces of the respective base and head portions which are opposed to each other, and opposite slot-defining surfaces of the connecting portion, so that the widthwise portions of the two annular bands extend through the respective two slots. Further, the fillets are formed at the corner between the outer surface of the base portion and each side surface of the connecting portion, and also at the corner between the inner surface of the head portion and each side surface of the connecting portion. Accordingly, stress concentrations at the corners between the base portion and the connecting portion and between the head portion and the connecting portion are effectively mitigated, so that a risk of breakage of the belt element due to the stress concentrations can be reduced.

In the belt element according to the fourth mode of the invention, the thickness of the part of the base portion located inwardly of the edge as seen with the loops of the annular bands continuously decreases as this part extends inwardly from the edge, and the base portion has the first inclined surface extending inwardly from the first edge as seen with respect to the loops of the annular bands, and the second inclined surfaces extending inwardly from the second edges as seen with respect to the loops of the annular bands. The first inclined surface and the second inclined surfaces have the respective first and second angles of inclination which are equal to each other. Accordingly, a gap between the base portion of the present belt element and the slots of another belt element when the base portion of the present belt element extends through the slot of that another belt element in the process of manufacture of the belt elements of the transmission belt is made larger than where the second angle of inclination of the second inclined surface is smaller than the first angle of inclination of the first inclined surface. Therefore, a risk of mutual entanglement of the belt elements in the process of manufacture of the belt elements of the transmission belt can be effectively reduced.

In the belt element according to the fifth mode of the invention, the thickness of the part of the base portion located inwardly of the edge as seen with respect to the loops of the annular bands continuously decreases as this part extends inwardly from the edge, and the base portion has the first inclined surface extending inwardly from the first edge as seen with respect to the loops of the annular bands, and the second inclined surfaces extending inwardly from the second edges as seen with respect to the loops of the annular bands. The first inclined surface has the first angle of inclination, while the second inclined surfaces have the second angle of inclination which is larger than the first angle of inclination. Accordingly, the gap between the base portion of the present belt element and the slots of another belt element when the base portion of the present belt element extends through the slot of that another belt element in the process of manufacture of the belt elements of the transmission belt is made larger than where the second angle of inclination of the second inclined surface is smaller than or equal to the first angle of inclination of the first inclined surface. Therefore, a risk of mutual entanglement of the belt elements in the process of manufacture of the belt elements of the transmission belt can be effectively reduced.

In the belt element according to the sixth mode of the invention, the distance between the second edges and the slot-defining surface of the base portion partially defining the slots is constant in the direction of width of the base portion. Accordingly, areas of parts of the butting surface of the base portion having the edge, which parts correspond to the second edges are made smaller than where the distance between the second edges and the outer surface of the base portion changes between positions corresponding to the widthwise ends of the head portion and the corresponding widthwise end portions of the base portion. Therefore, it is possible to ensure a comparatively large amount of gap between the base portion of the belt element and the slots of another belt element through which the base portion extends in the process of manufacture of the belt elements of the transmission belt.

In the belt element according to the seventh mode of the invention, the second edges are formed such that the distance between the second edges and the slot-defining surface of the base portion partially defining the slots decreases as the second edges extend toward the respective widthwise ends of the base portion. Accordingly, the base portion of the belt element extending through the slots of another belt element in the process of manufacture of the belt elements of the transmission belt can be more easily removed from the slots of the above-indicated another belt element. Therefore, a risk of mutual entanglement of the belt elements in the process of manufacture of the belt elements of the transmission belt can be effectively reduced.

In the belt element according to the eighth mode of the invention, the thickness of the part of the base portion located inwardly of the edge as seen with respect to the loops of the annular bands decreases stepwise. Owing to the thickness of the above-indicated part of the base portion which is smaller than that of the other part of the base portion located outwardly of the edge, the base portion of the belt element extending through the slots of another belt element in the process of manufacture of the belt elements of the transmission belt can be more easily removed from the slots of the above-indicated another belt element. Therefore, a risk of mutual entanglement of the belt elements in the process of manufacture of the belt elements of the transmission belt can be effectively reduced.

DETAILED DESCRIPTION OF A PREFERRED EMBODIMENT

Preferred embodiments of the present invention will be described in detail by reference to the drawings. It is to be understood that the drawings showing the embodiments are simplified or transformed as needed, and do not necessarily accurately represent dimensions and shapes of various elements of the embodiment.

First Embodiment

Figure 1:
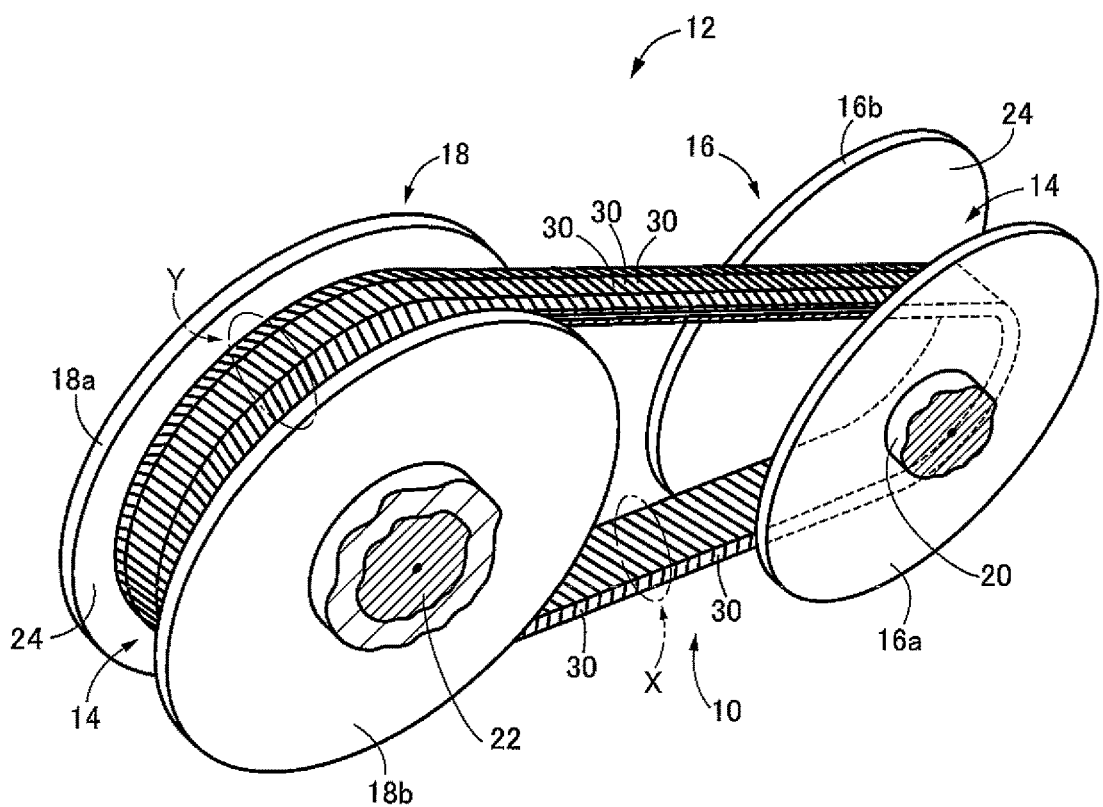
FIG. 1 is a perspective view of a vehicular belt-and-pulley type continuously variable transmission according to a first embodiment of this invention.
Figure 2:
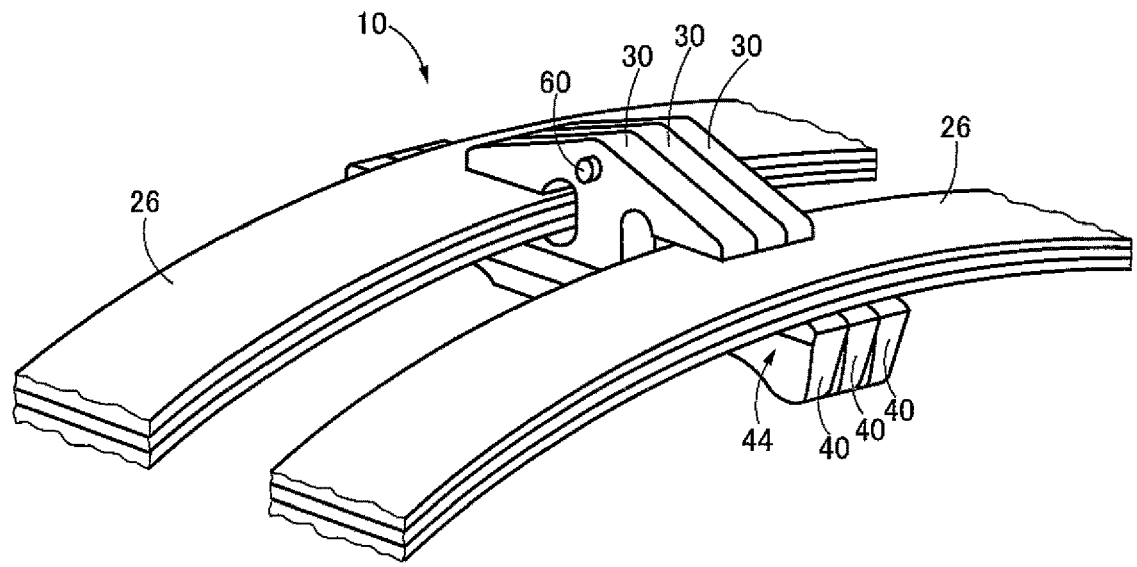
FIG. 2 is an enlarged view of a portion of a transmission belt of the continuously variable transmission of FIG. 1.

Reference is first made to FIGS. 1 and 2. FIG. 1 is the perspective view of a vehicular belt-and-pulley type continuously variable transmission 12 having a transmission belt 10 provided with a multiplicity of belt elements 30 according to a first embodiment of this invention. FIG. 2 is the enlarged view of a portion of the transmission belt 10 of the continuously variable transmission 12. As shown in FIGS. 1 and 2, the transmission belt 10 is a compressively power transmitting type metallic belt for the vehicular belt-and-pulley type continuously variable transmission 12, which metallic belt connects a pair of pulleys in the form of a drive pulley or primary pulley 16 and a driven pulley or secondary pulley 18 which are rotatable about respective axes parallel to each other. The primary and secondary pulleys 16 and 18 have respective grooves 14, which are Vee-grooves in a cross section of the pulleys 16 and 18 parallel to the axis thereof. Effective widths of the Vee-grooves 14 are variable as described below in detail. Namely, the drive pulley 16 includes a stationary rotary member 16a fixedly mounted on a drive shaft 20, and a movable rotary member 16b mounted on the drive shaft 20 such that the movable rotary member 16b is rotated together with the drive shaft 20 and is axially movable relative to the drive shaft 20. The driven pulley 18 includes a stationary rotary member 18a fixedly mounted on a driven shaft 22, and a movable rotary member 18b mounted on the driven shaft 22 such that the movable rotary member 18b is rotated together with the driven shaft 22 and is axially movable relative to the driven shaft 22. The stationary and movable rotary members 16a and 16b have respective sheave surfaces 24 opposed to each other and formed such that an axial distance between the two sheave surfaces 24 increases in a radially outward direction of the rotary members 16a and 16b. Similarly, the stationary and movable rotary members 18a and 18b have respective sheave surfaces 24 opposed to each other and formed such that an axial distance between the two sheave surfaces 24 increases in a radially outward direction of the rotary members 18a and 18b.

The transmission belt 10 consists of two annular bands 26, and the multiplicity of belt elements 30 which are supported by the two annular bands 26 such that the belt elements 30 are arranged side by side in a direction of their thickness annularly along the two annular bands 26. Each of the annular bands 26 consists of a plurality of annular steel sheets or strips superposed on each other. For example, each annular band 26 consists of seven, eight or nine annular strips of a high tensile-strength steel of a thickness of about 0.2 mm superposed on each other. Each belt element 30 is a thick planar piece obtained by punching a steel sheet of a thickness of about 1.8 mm. For instance, the transmission belt 10 is provided with several hundreds of belt elements 30.

Figure 3:
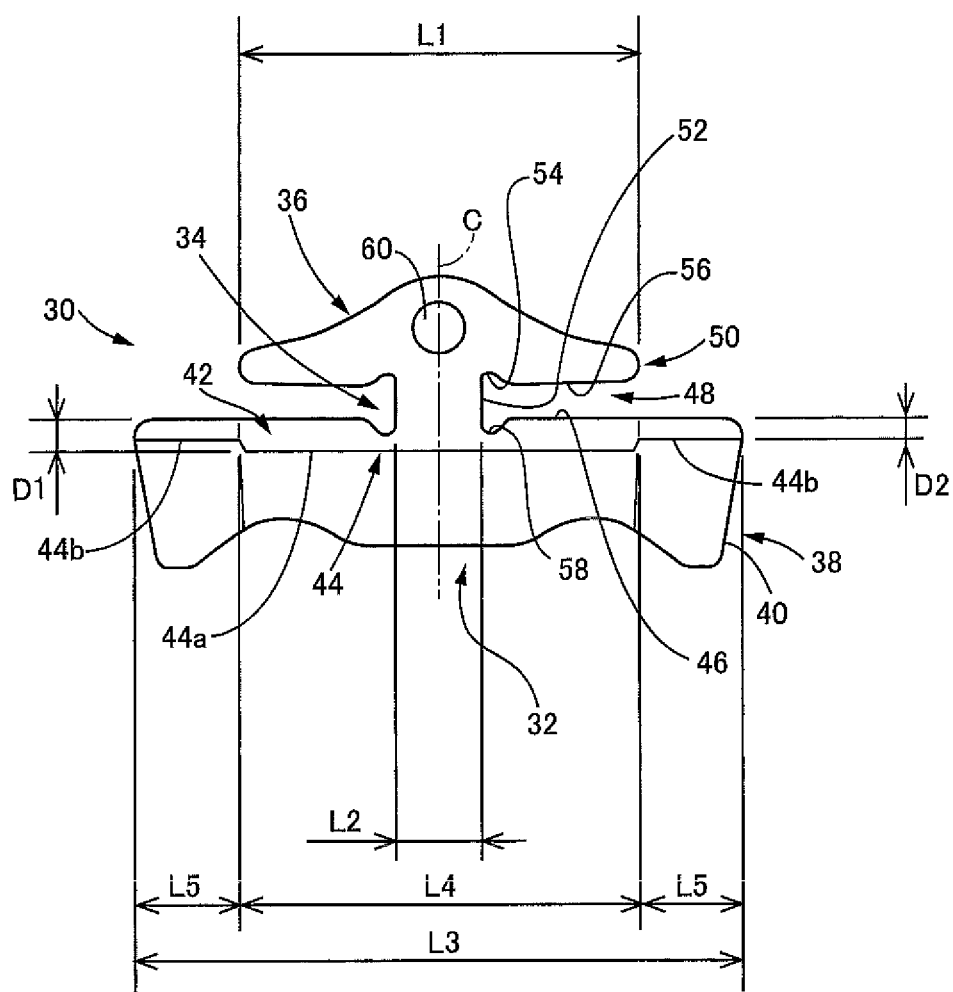
FIG. 3 is a front elevational view of one of belt elements of the transmission belt of FIG. 2.
Figure 4:
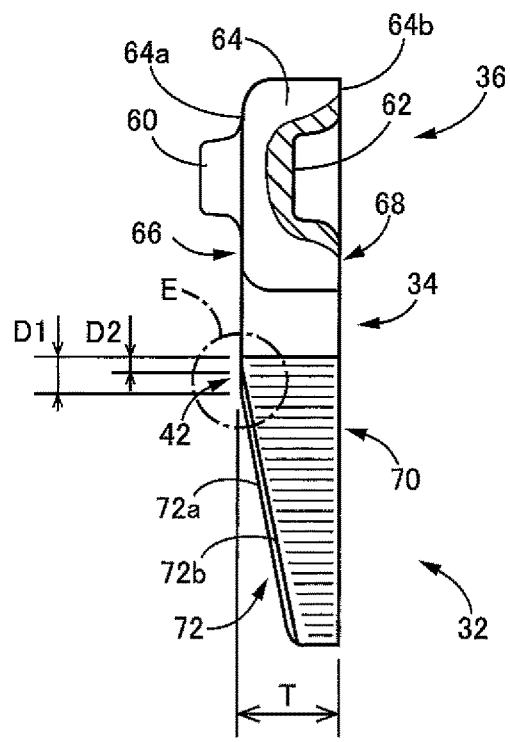
FIG. 4 is a side elevational view of the belt element of FIG. 3.

FIG. 3 is the front elevational view of one of the belt elements 30 of the transmission belt 10 of FIG. 2, and FIG. 4 is the side elevational view of the belt element 30 of FIG. 3. As shown in FIG. 3, the belt element 30 is symmetrical with respect to its widthwise centerline C in the direction of its width. The belt element 30 consists of: a base portion 32 having a generally trapeziform shape as seen in the front elevational view of FIG. 3; a connecting portion 34 formed integrally with the base portion 32 and protruding from a widthwise central part of the base portion 32 in an outward direction as seen with respect to loops of the annular bands 26; and a head portion 36 formed integrally with the connecting portion 34, on an outer side of the base portion 32 as seen with respect to the loops of the annular bands 26.

The base portion 32 has widthwise end portions 38 spaced apart from each other in its widthwise direction. These widthwise end portions 38 have respective widthwise end contact surfaces 40 for contacting with the respective two sheave surfaces 24 of the primary and secondary pulleys 16 and 18. The base portion 32 further has a butting surface 42 for abutting contact with one of the two adjacent belt elements 30 in the direction of their thickness, namely, in the direction of rotation of the transmission belt 10. This butting surface 42 has an edge 44 extending in a direction perpendicular to the widthwise centerline C, that is, in the direction of width of the belt element 30. The butting surface 42 functions to transmit or receive a thrust force to or from the adjacent belt element 30 during rotation of the vehicular transmission belt 10 which consists of the multiplicity of belt elements 30 arranged side by side in the direction of their thickness annularly along the two annular bands 26. The edge 44 includes a first edge 44a which functions as a fulcrum of the belt element 30 upon rocking of the belt element 30 relative to an abutting belt element and the adjacent belt elements 30, in a curved part Y of a loop of the transmission belt 10 indicated by a one-dot chain line in FIG. 1, by way of example.

As indicated in FIG. 3, the head portion 36 and the connecting portion 34 have respective width dimensions L1 and L2, which are smaller than a width dimension L3 of the base portion 32. The width dimension L2 of the connecting portion 34 is smaller than the width dimension L1 of the head portion 36.

In the present embodiment, the first edge 44a of the edge 44 of the base portion 32 is located inwardly of widthwise ends 50 of the head portion 36. Further, the first edge 44a has a length L4 (in the direction of width of the base portion 32), which is equal to the width dimension L1 of the head portion 36. Further, the edge 44 further has two second edges 44b located outwardly of the respective widthwise ends 50 of the head portion 36, namely, outside a range of the width dimension L1 of the head portion 36. Each of the second edges 44b has a length L5 (in the direction of width of the base portion 32), which is smaller than the length L4 of the first edge 44a. As indicated in FIG. 3, the first edge 44a and the second edges 44b are formed substantially continuously in the direction of width of the base portion 32.

The first edge 44a has a larger distance from a slot-defining surface 46 of the base portion 32 than the second edges 44b. The slot-defining surface 46, which is opposed to the head portion 36, partially defines slots 48 described below. Namely, the second edges 44b are formed so as to be located nearer to the head portion 36 than the first edge 44a. Since the first edge 44a and the second edges 44b are formed substantially continuously, the first and second edges 44a and 44b are connected to each other through a pair of slant surfaces formed as a pair of steps therebetween, so that the distance of the edge 44 from the slot-defining surface 46 continuously decreases in the width direction of the base portion 32 toward the widthwise end portions 38 (toward the widthwise end contact surfaces 40), as indicated in FIG. 3. The pair of slant surfaces are formed inwardly of the second edges 44b in the width direction of the base portion 32, that is, within a range of the length L4 of the first edge 44a. D1 and D2 in FIG. 3 respectively represent the distances of the first edge 44a and the second edges 44b from the slot-defining surface 46 of the base portion 32. The distance D1 of the first edge 44a from the slot-defining surface 46 is constant between the above-indicated pair of slant surfaces, and the distance D2 of the second edges 44b from the slot-defining surface 46 is constant in the width direction of the base portion 32. The slot-defining surface 46 functions as a saddle surface contacting and supporting the annular bands 26.

As shown in FIG. 3, the base portion 32, the head portion 36 and the connecting portion 34 of the belt element 30 cooperate to define two slots 48. Described more specifically, the slots 48 are defined by the slot-defining surface 46 of the base portion 32, a slot-defining surface 56 of the head portion 36, and opposite slot-defining surfaces 52 of the connecting portion 34. A widthwise portion of each of the two annular bands 26 extends through a corresponding one of the two slots 48, while the other widthwise portion of each annular band 26 is located outside the corresponding slot 26, which is open sideways in the direction away from the connecting portion 34. A fillet 54 is formed at a corner between the slot-defining surface 56 of the head portion 36 and each of the opposite slot-defining surfaces 52 of the connecting portion 34, while a fillet 58 is formed at a corner between the slot-defining surface 46 of the base portion 32 and each side surface 52 of the connecting portion 34.

As shown in FIGS. 3 and 4, the head portion 36 has two butting surfaces 66 and 68 opposed to each other in the direction of its thickness and provided for abutting contacts with the respective two adjacent belt elements 30 in the direction of its thickness. This butting surface 66 of the head portion 36 corresponds to the butting surface 42 of the base portion 32. The butting surface 66 has a raised portion 60 in its widthwise central part. On the other hand, the butting surface 68 has a recessed portion 62 in its widthwise central part. The recessed portion 62 of the belt element 30 is engageable with the raised portion 60 of the head portion 36 of one of the two adjacent belt elements 30. The head portion 36 includes a thrust portion 64 extending in its widthwise outward directions from the widthwise central part in which the raised and recessed portions 60 and 62 are formed. The thrust portion 64 functions to transmit or receive a thrust force to or from the adjacent belt elements 30, with abutting contact with these adjacent belt elements 30. The thrust portion 64 has respective opposite thrust surfaces 64a and 64b corresponding to the respective butting surfaces 66 and 68 opposed to each other in the thickness direction of the head portion 36. These thrust surfaces 64a and 64b transmit or receive the thrust force to and from the adjacent belt elements 30 when the belt elements 30 are located in a linear part X of the loop of the transmission belt 10 indicated by a one-dot chain line in FIG. 1, by way of example.

As indicated in FIG. 4, the base portion 32 has the same thickness T measured at the first edge 44a and the second edges 44b which are respectively located inwardly and outwardly of the widthwise ends 50 of the head portion 36. That is, the thickness T of the base portion 32 or the thickness dimension of its outer surface (saddle surface) 46 which is measured at the edge 44 is constant over an entire range of the edge 44. The base portion 32 has a butting surface 70 opposed to the butting surface 42 described above. The butting surface 42 has an inclined surface 72 inclined with respect to the butting surface 70. This inclined surface 72 is formed inwardly of the edge 44 as seen with respect to the loops of the annular bands 26, such that the thickness of a part of the base portion 32 located inwardly of the edge 44 continuously decreases as this part extends from the edge 44 inwardly as seen with respect to the loops of the annular bands 26. Thus, the thickness of the above-indicated part of the base portion 32 is smaller than the thickness T of the base portion 32 measured at the edge 44.

Figure 5:
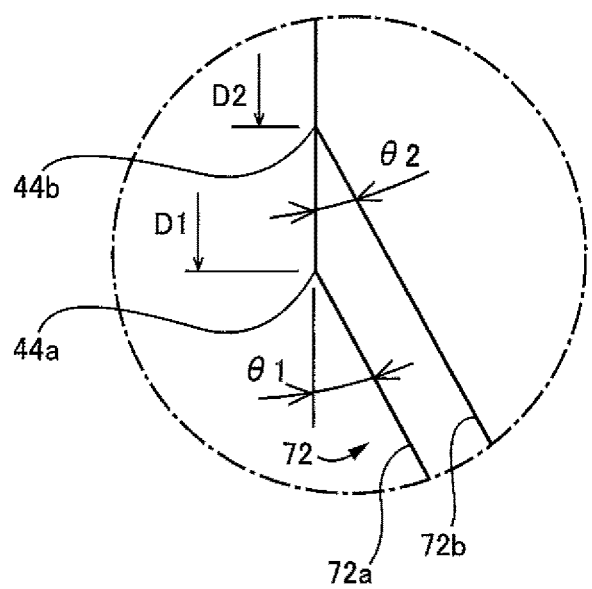
FIG. 5 is an enlarged view of a portion E of inclined surfaces shown in the side elevational view of FIG. 4.

FIG. 5 is the enlarged view of a portion E of FIG. 4 enclosed by a one-dot chain line. That is, FIG. 5 shows a part of the inclined surface 72 in enlargement. As shown in FIGS. 4 and 5, the second edges 44b from which second inclined surfaces 72b extend inwardly are located outwardly of the first edge 44a from which a first inclined surface 72a extends inwardly, namely, located nearer to the head portion 36 than the first edge 44a. Described more specifically, the distance D1 between the slot-defining surface 46 and the first edge 44a is larger than the distance D2 between the slot-defining surface 46 and the second edges 44b, as indicated in FIGS. 3-5. The first inclined surface 72a and the second inclined surfaces 72b have respective first and second inclination angles θ1 and θ2 with respect to the butting surface 42. In the present embodiment, the first and second inclination angles θ1 and θ2 are equal to each other.

Figure 6:
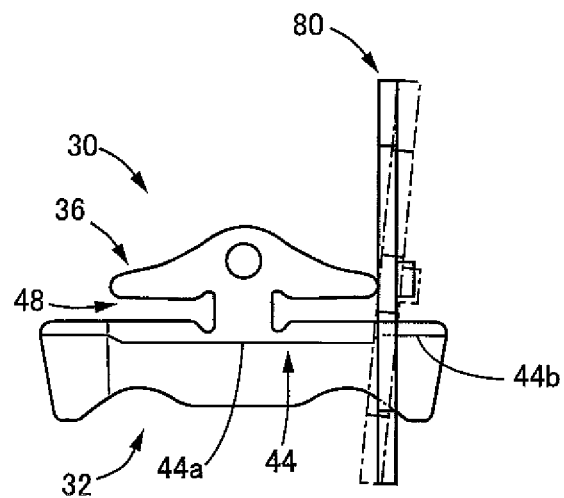
FIG. 6 is a front elevational view showing two belt elements entangled with each other in the process of manufacture of the belt elements.
Figure 7:
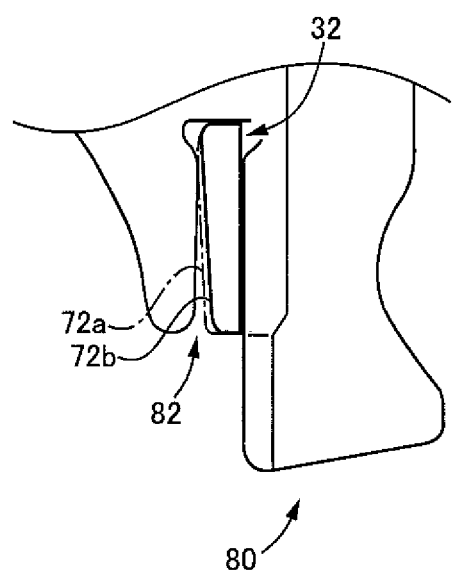
FIG. 7 is a side elevational view showing the two belt elements entangled with each other.

By the way, the belt elements 30 are subjected to a barrel polishing or finishing operation to remove burrs generated in a blanking operation in the process of its manufacture. In this barrel polishing operation, the belt elements 30 may be entangled with each other, so that the burrs cannot be sufficiently removed, or the belt elements 30 cannot be given a desired or intended shape or configuration. FIG. 6 is the front elevational view showing the belt element 30 entangled with another belt element 80 in the process of a barrel polishing or finishing operation, and FIG. 7 is the enlarged fragmentary side elevational view of the belt elements 30 and 80 shown in FIG. 6, showing that the base portion 32 of the belt element 30 extends through a slot 82 formed in the belt element 80. For example, the barrel polishing operation is performed in a barrel of a barrel polishing machine, which is charged with a compound or water and in which a multiplicity of belt elements 30, 80 are introduced together with polishing stones. The barrel is vibrated to polish the belt elements 30, 80 in a wet-polishing fashion. Accordingly, the belt elements 30, 80 are freely moved within the barrel, so that a widthwise end part of the belt element 30, for instance, a part of the base portion 32 located outwardly of one of the widthwise ends 50 of the head portion 36 may extend through one of two slots 82 of the belt element 80, where the thickness of the above-indicated part of the belt element 30 is smaller than the depth of the slot 82. If the barrel polishing operation is performed with free movements of the belt elements 30 and 80 while the part of the belt element 30 is kept extending through the slot 82 of the adjacent belt element 80, the adjacent element 80 may be inclined with respect to the belt element 30, as indicated by a one-dot chain line in FIG. 6. If the belt elements 30 and 80 are entangled with each other, with the belt element 80 being inclined with respect to the belt element 30, the belt elements 30 and 80 are subjected to the barrel polishing operation, while the belt elements 30 and 80 are held in contact with each other, so that mutually contacting parts of the belt elements 30 and 80 are not sufficiently polished, resulting in insufficient removal of the burrs, and giving rise to a risk of consequent deterioration of quality of the belt element 30 (80).

A one-dot chain line in FIG. 7 indicates the first inclined surface 72a extending inwardly from the first edge 44a formed on the base portion 32 of the belt element 30. Since the second edges 44b located outwardly of the widthwise ends 50 of the head portion 36 are located nearer to the head portion 36 than the first edge 44a, a gap between the second inclined surfaces 72b and the slot 82 is larger than a gap between the first inclined surface 72a and the slot 82. Namely, a gap between the slot 82 and the second edges 44b is larger than a gap between the slot 82 and the first edge 44a located inwardly of the widthwise ends 50. Owing to the larger gap between the slot 82 and the second edges 44b at which the belt element 30 is comparatively likely to be entangled with the belt element 80, the belt element 30 can be easily removed from the belt element 80.

According to the belt element 30 for the vehicular transmission belt 10 according to the present embodiment of the invention described above, the base portion 32, the head portion 36 and the connecting portion 34 define the slots 48, and the base portion 32 has the edge 44 extending in the direction of its width. The edge 44 includes the first edge 44a located inwardly of the widthwise ends 50 of the head portion 36 and functioning as the fulcrum of the belt element 30 upon rocking of the belt element 30 relative to the abutting belt element, and the second edges 44b located outwardly of the widthwise ends 50 of the head portion 36. The base portion 32 has the smaller thickness on the inner side of the edge 44 as seen with respect to the loops of the annular bands 26, than the thickness T on the outer side of the edge 44 as seen with respect to the loops. Further, the second edges 44b are formed so as to be located nearer to the head portion 36 in the direction of rotation of the transmission belt 10, than the first edge 44a located inwardly of the widthwise ends 50 of the head portion 36. According to the present belt element 30, therefore, a larger amount of gap is maintained between a part of the base portion 32 of the present belt element 30, which part corresponds to the second edge 44b, and the slot 82 of another belt element 80 through which the base portion 32 of the present belt element 30 extends in the process of manufacture of the belt elements 30, 80 of the vehicular transmission belt 10, than where the first edge (44a) located inwardly of the widthwise ends 50 of the head portion 36, and the second edges (44b) located outwardly of those widthwise ends 50 are spaced apart from the head portion 36 by the same distance. Accordingly, the base portion 32 of the present belt element 30 extending through the slot 82 of the belt element 80 can be more easily removed out of the slot 82. Thus, the structure of the present belt element 30 has a reduced risk of entanglement with the belt element 80 in the process of manufacture of the belt elements 30 and 80, so that the belt elements 30 and 80 can be sufficiently polished in the barrel polishing operation, whereby the quality of the present belt element 30 for the vehicular transmission belt 10 can be improved.

The belt element 30 of the transmission belt 10 according to the present embodiment is further configured such that the base portion 32 has the same thickness T at the first edge 44a and the second edges 44b, so that the belt element 30 has a larger surface area of contact with the annular bands 26 along which the multiplicity of belt elements 30 are arranged side by side in the direction of their thickness, than where the thickness of the base portion 32 at the second edges 44b is smaller than that at the first edge 44a. Accordingly, it is possible to reduce a risk of application of an excessively large stress to the annular bands 26.

The belt element 30 of the transmission belt 10 according to the present embodiment is also configured such that the two slots 48 are defined by the slot-defining surfaces 46 and 56 of the respective base and head portions 32 and 36 which are opposed to each other, and the opposite slot-defining surfaces 52 of the connecting portion 34, so that the widthwise portions of the two annular bands 26 extend through the respective two slots 48. Further, the fillet 58 is formed at the corner between the slot-defining surface 46 of the base portion 32 and each side surface 52 of the connecting portion 34, and the fillet 54 is also formed at the corner between the slot-defining surface 56 of the head portion 36 and each side surface 52 of the connecting portion 34. Accordingly, stress concentrations at the corners between the base portion 32 and the connecting portion 34 and between the head portion 36 and the connecting portion 34 are effectively mitigated, so that a risk of breakage of the belt element 30 due to the stress concentrations can be reduced.

The belt element 30 of the transmission belt 10 according to the present embodiment is further configured such that the thickness of the part of the base portion 32 located inwardly of the edge 44 as seen with respect to the annular bands 26 continuously decreases as this part extends inwardly from the edge 44, and the base portion 32 has the first inclined surface 72a extending inwardly from the first edge 44a as seen with respect to the loops of the annular bands 26, and the second inclined surfaces 72b extending inwardly from the second edges 44b as seen with respect to the loops of the annular bands 26. The first inclined surface 72a and the second inclined surfaces 72b have the respective first and second inclination angles θ1 and θ2 which are equal to each other. Accordingly, the gap between the base portion 32 of the belt element 30 and the slots 82 of the belt element 80 when the base portion 32 of the belt element 30 extends through the slot 82 of the belt element 80 in the process of manufacture of the belt elements 30 and 80 of the transmission belt 10 is made larger than where the second inclination angle θ2 of the second inclined surfaces 72b is smaller than the first inclination angle θ1 of the first inclined surface 72a. Therefore, a risk of mutual entanglement of the belt elements 30 and 80 in the process of manufacture of the belt elements 30 and 80 of the transmission belt 10 can be effectively reduced.

The belt element 30 of the transmission belt 10 according to the present embodiment is also configured such that the distance D2 between the second edges 44b and the slot-defining surface 46 of the base portion 32 is constant in the direction of width of the base portion 32. Accordingly, areas of parts of the butting surface 42 of the base portion 32 having the edge 44, which parts correspond to the second edges 44b are made smaller than where the distance D2 between the second edges 44b and the slot-defining surface 46 changes between positions corresponding to the widthwise ends 50 of the head portion 36 and the corresponding widthwise end portions 38 of the base portion 32. Therefore, it is possible to ensure a comparatively large amount of gap between the base portion 32 of the belt element 30 and the slots 82 of the belt element 80 through which the base portion 32 extends in the process of manufacture of the belt elements 30 and 80 of the transmission belt 10.

Second Embodiment

Other embodiments of this invention will be described. It is to be understood that the same reference signs as used in the first embodiment will be used to identify the corresponding elements, which will not be described redundantly.

Figure 8:
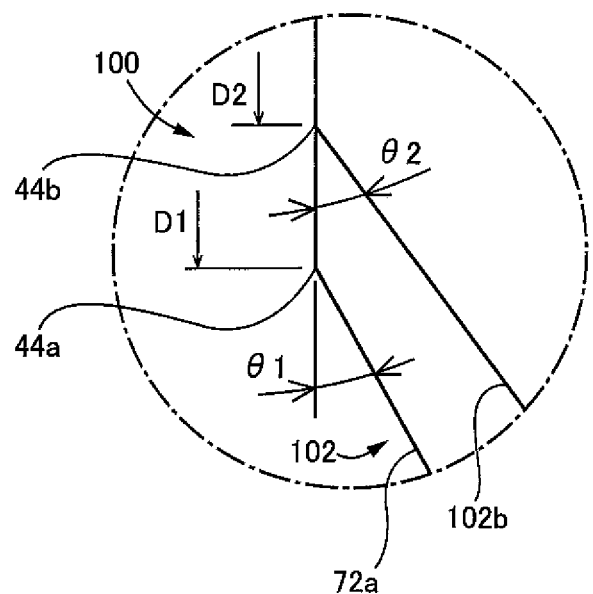
FIG. 8 is an enlarged view of portions of inclined surfaces of a belt element according to a second embodiment of the invention.

FIG. 8 is the enlarged view of portions of inclined surfaces 102 of a belt element 100 according to a second embodiment of the invention. FIG. 8 corresponds to FIG. 5 in the first embodiment. A second inclined surface 102b shown in FIG. 8 extends inwardly as seen with respect to the loops of the annular bands 26, from the second edge 44b which is located outwardly of the widthwise end 50 of the head portion 36 of the belt element 100. As shown in FIG. 8, the second edge 44b from which the second inclined surface 102b extends inwardly is located nearer to the slot-defining surface 46 of the base portion 32, that is, nearer to the head portion 36, than the first edge 44a from which the first inclined surface 72a extends inwardly. As also shown in FIG. 8, a second inclination angle θ2 of the second inclined surface 102b is larger than the first inclination angle θ1 of the first inclined surface 72a.

As described above, the present second embodiment is also configured such that the thickness of the part of the base portion 32 located inwardly of the edge 44 as seen with respect to the loops of the annular bands 26 continuously decreases as this part extends inwardly from the edge 44. Further, the second inclination angle θ2 of the second inclined surface 102b of the base portion 32 extending inwardly from the second edge 44b located outwardly of the widthwise end 50 of the head portion 36 is made larger than the first inclination angle θ1 of the first inclined surface 72a of the base portion 32 extending inwardly from the first edge 44a located inwardly of the widthwise end 50 of the head portion 36. Accordingly, the gap between the base portion 32 of the belt element 100 and the slots 82 of the belt element 80 when the base portion 32 of the belt element 100 extends through the slot 82 of the belt element 80 in the process of manufacture of the belt elements 100 and 80 of the transmission belt 10 is made larger than where the second inclination angle θ2 is smaller than or equal to the first inclination angle θ1. Therefore, a risk of mutual entanglement of the belt elements 100 and 80 in the process of manufacture of the belt elements 100 and 80 of the transmission belt 10 can be effectively reduced.

Third Embodiment

Figure 9:
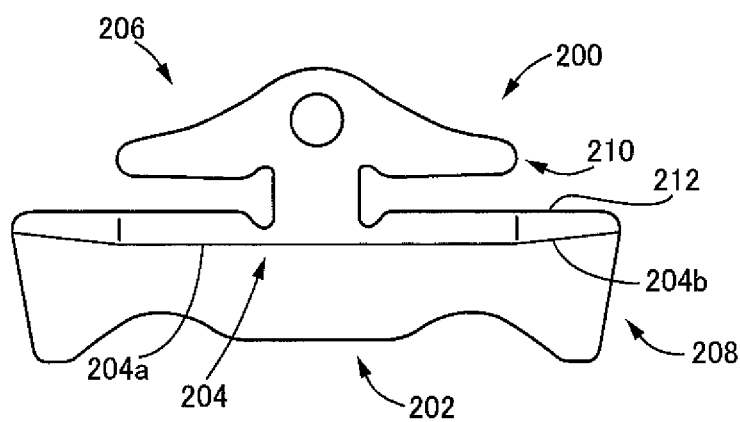
FIG. 9 is a front elevational view of a belt element according to a third embodiment of the invention.

FIG. 9 is the front elevational view of a belt element 200 according to a third embodiment of the invention. As shown in FIG. 9, the belt element 200 includes a base portion 202 having an edge 204, and a head portion 206. The edge 204 includes a first edge 204a located inwardly of widthwise ends 210 of the head portion 206, and second edges 204b located outwardly of the respective widthwise ends 210. The second edges 204b are formed continuously with the first edge 204a, and inclined such that a distance between the second edges 204b and a slot-defining surface 212 of the base portion 202 partially defining the slots decreases as the second edges 204b extend toward respective widthwise ends 208 of the base portion 202.

As described above, the present third embodiment is configured such that the second edges 204b are formed such that the distance between the second edges 204b and the slot-defining surface 212 of the base portion 202 decreases as the second edges 204b extend toward the respective widthwise ends 208 of the base portion 202. Accordingly the base portion 202 of the belt element 200 extending through the slots of another belt element (not shown in FIG. 9) in the process of manufacture of the belt elements 200 of the transmission belt 10 can be more easily removed from the slots of the above-indicated another belt element. Therefore, a risk of mutual entanglement of the belt elements in the process of manufacture of the belt elements 200 of the transmission belt 10 can be effectively reduced.

Fourth Embodiment

Figure 10:
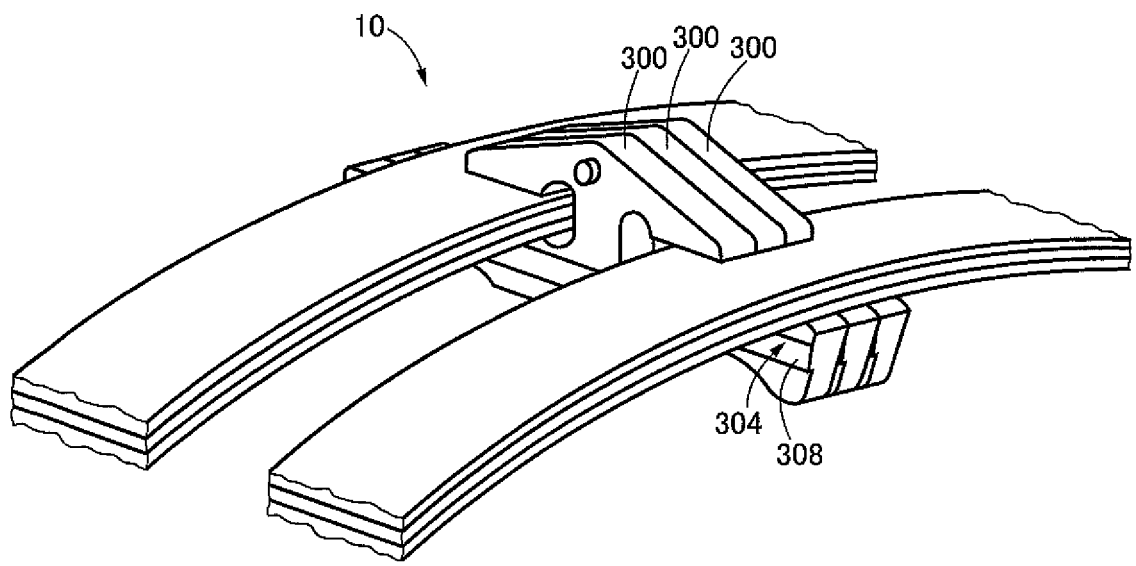
FIG. 10 is an enlarged view of a portion of a transmission belt of a vehicular belt-and-pulley type continuously variable transmission according to a fourth embodiment of the invention.
Figure 11:
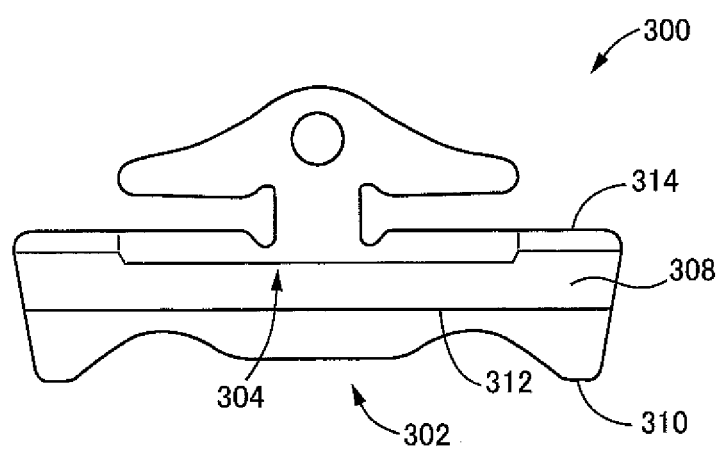
FIG. 11 is a front elevational view of one of belt elements of the transmission belt of FIG. 10.

FIG. 10 is the enlarged view of a portion of the transmission belt 10 according to a fourth embodiment of the invention, and FIG. 11 is the front elevational view of one of belt elements 300 of the transmission belt 10 of FIG. 10. As shown in FIGS. 10 and 11, each belt element 300 includes a base portion 302 having an edge 304. The base portion 302 is formed such that a thickness of a part of the base portion 302 located inwardly of the edge 304 as seen with respect to the loops of the annular bands 26 is smaller than a thickness T of a part of the base portion 302 located outwardly of the edge 304. The base portion 302 has two butting surfaces opposed to each other in the direction of its thickness. One of these two butting surfaces includes an inclined surface 308 which is inclined with respect to the other butting surface. The inclined surface 308 extends from the edge 304 inwardly as seen with respect to the loops of the annular bands 26. The inclined surface 308 is inclined such that thickness of the inclined surface 308 decreases as the inclined surface 308 extends inwardly from the edge 304. Further, the base portion 302 has a secondary edge 312 formed inwardly of the edge 304 and outwardly of its inner surface 310, as seen with respect to the loops of the annular bands 26, namely, between the edge 304 and the inner surface 310. The secondary edge 312 is formed so as to extend in the direction of width of the base portion 302, and such that a distance between the secondary edge 312 and a slot-defining surface 314 of the base portion 302 partially defining the slots is constant in the width direction of the base element 302. The inclined surface 308 extends from the edge 304 to the secondary edge 312. A part of the base portion 302 located inwardly of the secondary edge 312 has a thickness smaller than a thickness of a part of the base portion 302 located outwardly of the secondary edge 312. Thus, the thickness of the part of the base portion 302 located inwardly of the edge 304 as seen with respect to the loops of the annular bands 26 decreases stepwise at the secondary edge 312.

As described above, the present fourth embodiment is configured such that the thickness of the part of the base portion 302 located inwardly of the edge 304 as seen with respect to the loops of the annular bands 26 decreases stepwise. Owing to the thickness of the above-indicated part of the base portion 302 which is smaller than that of the other part of the base portion 302 located outwardly of the edge 304, the base portion 302 of the belt element 300 extending through the slots of another belt element in the process of manufacture of the belt elements 300 of the transmission belt 10 can be more easily removed from the slots of the above-indicated another belt element. Therefore, a risk of mutual entanglement of the belt elements in the process of manufacture of the belt elements 300 of the transmission belt 10 can be effectively reduced.

While the preferred embodiments of this invention have been described above in detail by reference to the drawings, it is to be understood that the invention may be otherwise embodied.

Although the reduction of the risk of mutual entanglement of the belt elements 30, 100, 200, 300 in a barrel polishing or finishing operation in the process of their manufacture has been described as the advantage of the illustrated embodiments of the invention, the risk of mutual entanglement of the belt elements in any manufacturing operation other than the barrel polishing operation can be reduced according to the present invention.

In the illustrated embodiments, the slant surfaces are formed between the first edge 44a, 204a and the second edges 44b, 204b. However, these slant surfaces need not be formed.

In the illustrated embodiments, the length L4 of the first edge 44a, 204a is equal to the width dimension L1 of the head portion 36, 206. However, the length L4 may be different from the width dimension L1 of the head portion 36, 306.

While the preferred embodiments and modifications have been described for illustrative purpose only, it is to be understood that the present invention may be embodied with various other changes and improvements, which may occur to those skilled in the art.

NOMENCLATURE OF ELEMENTS

10: transmission belt
16: primary pulley (drive pulley)
18: secondary pulley (driven pulley)
26: annular band
30, 100, 200, 300: belt element
32, 202, 302: base portion
34: connecting portion
36, 206: head portion
44, 204, 304: edge
44a, 204a: first edge
44b, 204b: second edges
46, 212, 314: slot-defining surface of base portion 32, 202, 302
48: slots
52: slot-defining surfaces of connecting portion 34
54, 58: fillets
56: slot-defining surface of head portion 36
θ1: first inclination angle
θ2: second inclination angle

What is claimed is:

1. A belt element for a vehicular transmission belt connecting a pair of pulleys to each other and including two annular bands, and a multiplicity of belt elements which are supported by the two annular bands such that the belt elements are arranged side by side in a direction of their thickness annularly along the two annular bands, the belt element comprising a generally trapeziform base portion, a head portion having a smaller width dimension in a direction of width of the annular bands than the base portion, and a connecting portion connecting the base portion and the head portion integrally to each other at central parts thereof in the direction of width of the annular bands, the belt element further comprising:

two slots for engagement with the respective two annular bands defined by the base portion, the head portion and the connecting portion;

the base portion has an edge extending in a direction of width of the belt element, the edge including a first edge functioning as a fulcrum of the belt element upon rocking of the belt element relative to an abutting belt element, and second edges located outwardly of the widthwise ends of the head portion;

the base portion has a smaller thickness on an inner side of the edge as seen with respect to loops of the annular bands, than on an outer side of the edge as seen with respect to the loops; and the second edges are formed so as to be located nearer to the head portion than the first edge;

wherein a thickness of a part of the base portion located inwardly of the edge as seen with respect to the loops of the annular bands continuously decreases as this part extends inwardly from the edge, and the base portion has a first inclined surface extending inwardly from the first edge as seen with respect to the loops of the annular bands, and second inclined surfaces extending inwardly from the second edges as seen with respect to the loops of the annular bands, the first inclined surface and the second inclined surfaces have respective first and second angles of inclination which are equal to each other.

2. The belt element according to claim 1, wherein the base portion has the same thickness at the first edge and the second edges.

3. The belt element according to claim 1, wherein the two slots are defined by slot-defining surfaces of the respective base and head portions which are opposed to each other, and opposite slot-defining surfaces of the connecting portion, and widthwise portions of the two annular bands extend through the respective two slots, and wherein a fillet is formed at a corner between the outer surface of the base portion and each of the opposite side surfaces of the connecting portion, while another fillet is formed at a corner between the inner surface of the head and said each side surface of the connecting portion.

4. The belt element according to claim 1, wherein a distance between the second edges and a slot-defining surface of the base portion partially defining the slots is constant in the direction of width of the base portion.

5. The belt element according to claim 1, wherein a distance between the second edges and a slot-defining surface of the base portion partially defining the slots decreases as the second edges extend toward respective widthwise ends of the base portion.

6. The belt element according to claim 1, wherein a thickness of a part of the base portion located inwardly of the edge as seen with respect to the loops of the annular bands decreases stepwise.

* * * * *